No. 828,649. PATENTED AUG. 14, 1906.
P. C. GREENAWALT.
HINGE.
APPLICATION FILED JULY 6, 1904.
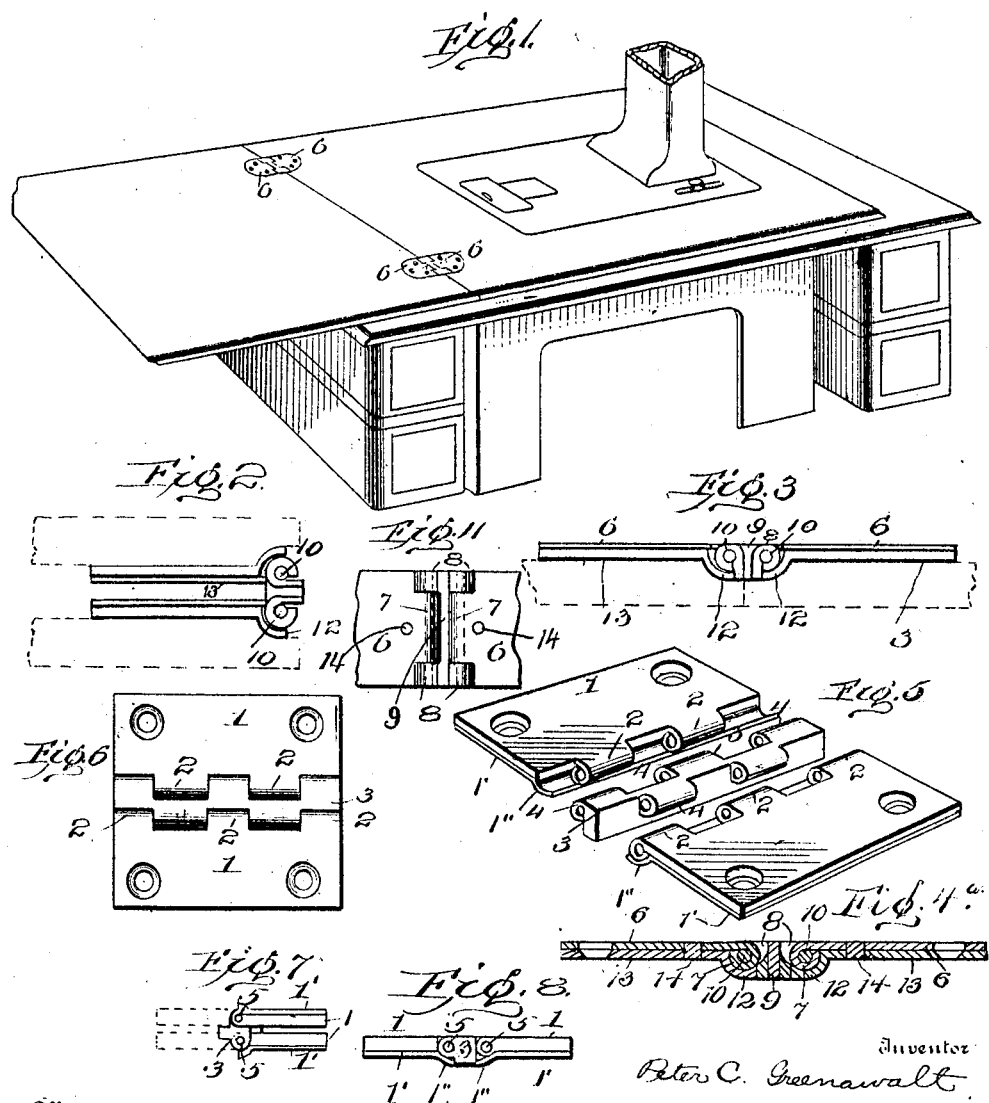
Witnesses
J. M. Fowler Jr
Edgar M. Kitchin
Inventor
Peter C. Greenawalt
By Mason, Fenwick & Lawrence
His Attorneys

UNITED STATES PATENT OFFICE.

PETER C. GREENAWALT, OF READING, PENNSYLVANIA.

HINGE.

No. 828,649.     Specification of Letters Patent.     Patented Aug. 14, 1906.

Application filed July 6, 1904. Serial No. 215,543.

*To all whom it may concern:*

Be it known that I, PETER C. GREENAWALT, a citizen of the United States, residing at Reading, in the county of Berks and State of Pennsylvania, have invented certain new and useful Improvements in Hinges; and I do hereby declare the following to be a full, clear, and exact description of the invention, such as will enable others skilled in the art to which it appertains to make and use the same.

This invention relates to improvements in hinges, and particularly to a form of hinge provided with means for supporting the leaves with their faces flush with respect to each other.

The object in view is the provision of stop-plates in conjunction with a hinge designed to retain the leaves of the hinge flush with respect to each other when in an open condition.

With this and further objects in view the invention comprises certain novel constructions, combinations, and arrangements of parts, as will be hereinafter fully described and claimed.

In the accompanying drawings, Figure 1 represents a perspective view of a fragment of a sewing-machine, illustrating the present improved hinge applied thereto. Fig. 2 represents an edge view of the hinge detached, the connected plates being indicated in dotted lines and the parts of the hinge being shown in a folded position. Fig. 3 represents a similar view of the same in an extended position. Fig. 4 represents a fragmentary top plan view of the hinge. Fig. 4ª represents a longitudinal vertical central section taken through the structure shown in Fig. 4. Fig. 5 represents a perspective view of a modified form of the hinge. Fig. 6 represents a top plan view of the same. Fig. 7 represents an edge view of the hinge disclosed in Figs. 5 and 6 in a folded position. Fig. 8 represents an edge view thereof.

Referring to the drawings by numerals, and particularly with respect to Figs. 1 to 4ª, inclusive, 6 6 indicate leaves of the present improved hinge, each provided with an eye 7, extending inwardly from the inner edge thereof, each of said eyes being positioned in operation in line with eyes 8 8, projecting laterally from the opposite sides of a central link 9. The eye 7 of the respective leaves is adapted to be connected with the corresponding eyes 8 of the link 9 by means of a suitable pintle 10. The upper surface of each eye 7 is flush with the upper surface of the respective leaves, and the upper surfaces of the eyes 8 are flush with the upper surface of the link 9, the upper surfaces of said link 9 and said eyes 8 being in operation flush with the upper surface of the leaves 6 when the leaves are extended, as indicated in Fig. 3. The link 9 is of sufficient width to extend beyond the plane of the lower surfaces of the eyes 8 and of the eyes 7, and said link in practice is designed to be engaged upon its opposite sides by the curved portion 12 of stop-plates 13 13, fixed to the under surface of the leaves 6, preferably by rivets 14. Of course it will be understood that the stop-plates 13 may be of any desired thickness and secured to the leaves 6 in any desired manner, the curved portion 12 of each of said leaves being of sufficient length to engage the corresponding side of the link 9 when the leaves are in an open condition, as indicated in Fig. 3. It is further to be noted that the link 9 is preferably made up of a central strip of material, to which are secured side strips, from which are formed eyes 8; but of course the central strip and the side strips may be formed integral, if desired, and the result will be the same.

In practice the hinge is adapted particularly for use in connection with drop-head sewing-machines, such as is indicated in Fig. 1 of the drawings, and the stop-plates 13, with their curved portions 12, are adapted to retain the hinge with the upper surfaces of the leaves 6 in a flush condition when the top plate of the machine is hinged outwardly to form a leaf.

In Figs. 5, 6, 7, and 8 I have illustrated a slightly-modified form of the present improved structure, in which 1 1 indicate leaves provided with suitable eyes 2 2, arranged at the inner edge. A central link 3 is positioned between the leaves 1 and is provided with oppositely-disposed eyes 4 4, extending laterally from the sides of the bar 3, the eyes 4 being positioned to alternate with the eyes 2, so as to fit between the same. Secured to the under surface of each leaf 1 is a stop-plate 1', provided with a curved portion 1'' at the edge thereof, surrounding the lower portion of the respective eyes 2 and adapted in operation to engage the lower depending edge of the link 3 for stopping the leaves 1 with their upper surfaces in an extended condition, the upper surfaces of the link 3 and eyes 4 being of course flush with the upper surfaces of the leaves 1 and said eyes 2 and 4 being pivoted together by suitable pintles 5 5. Thus it will be seen that by the employment of a central link provided with laterally-projecting eyes adapted to engage the eyes of the laterally-disposed leaves, the link being extended below the eyes, stop-plates having curved portions surrounding the eyes may be employed, which will engage the portion of the central link extending below the eyes and will support the leaves in a flush condition when extended and will readily permit a folding together of the leaves when desired.

While I have illustrated the present improved hinge as applied to a sewing-machine, it will of course be understood that the same may be applied to any structure where it is desirable to have a stop for supporting the leaves of a hinge in a flush condition.

Having thus fully described my invention, what I claim as new, and desire to secure by Letters Patent, is—

1. A hinge, comprising a central link having eyes projecting laterally therefrom, the link extending below said eyes, leaves disposed laterally with respect to said eye, and having eyes projecting therefrom in line with the respective eyes of said link, pintles connecting said eyes and a stop-plate carried by each of said leaves and curved past the respective eyes and positioned for engaging said link when the leaves are in an open condition.

2. A hinge, comprising a central link having an eye projecting laterally from each edge thereof, the body of the link extending below said eyes, leaves positioned upon opposite sides of said link, each of said leaves having an eye extending therefrom in line with the corresponding eye of said link, pintles connecting the eyes of the link and leaves, and a plate separate from and attached to each of said leaves and curved about and past the respective eye thereof in position for engaging the said link when the leaves are in an extended condition.

In testimony whereof I hereunto affix my signature in presence of two witnesses.

PETER C. GREENAWALT.

Witnesses:
 MARTHA S. HOVERTER,
 SHERMAN H. HOVERTER.